(12) United States Patent
Pedanekar et al.

(10) Patent No.: US 9,588,965 B2
(45) Date of Patent: Mar. 7, 2017

(54) IDENTIFYING AND CHARACTERIZING AN ANALOGY IN A DOCUMENT

(71) Applicant: Tata Consultancy Services Limited, Mumbai, Maharashtra (IN)

(72) Inventors: Niranjan Pedanekar, Maharashtra (IN); Varun Kumar, Maharashtra (IN); Savita Suhas Bhat, Maharashtra (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/672,897

(22) Filed: Mar. 30, 2015

(65) Prior Publication Data

US 2016/0292150 A1    Oct. 6, 2016

(51) Int. Cl.
*G06F 17/27* (2006.01)
*G06F 17/28* (2006.01)

(52) U.S. Cl.
CPC .......... *G06F 17/28* (2013.01); *G06F 17/2765* (2013.01)

(58) Field of Classification Search
None
See application file for complete search history.

(56) References Cited

U.S. PATENT DOCUMENTS

| | | | |
|---|---|---|---|
| 5,675,710 A | 10/1997 | Lewis | |
| 6,523,026 B1 * | 2/2003 | Gillis | G06F 17/30637 |
| 7,856,351 B2 * | 12/2010 | Yaman | G10L 15/1815 |
| | | | 704/251 |
| 8,788,261 B2 * | 7/2014 | Sikstrom | G06F 17/2785 |
| | | | 704/255 |
| 8,868,446 B2 * | 10/2014 | Lamoureux | G06Q 30/02 |
| | | | 705/14.72 |
| 9,111,298 B2 * | 8/2015 | Lamoureux | G06Q 30/02 |
| 9,208,132 B2 * | 12/2015 | DeBlois | G06Q 30/02 |
| 9,208,515 B2 * | 12/2015 | Lamoureux | G06Q 30/02 |
| 9,218,614 B2 * | 12/2015 | Lamoureux | G06Q 30/02 |
| 9,262,776 B2 * | 2/2016 | Lamoureux | G06Q 30/02 |
| 9,292,491 B2 * | 3/2016 | Sikstrom | G06F 17/2785 |
| 2012/0323888 A1 | 12/2012 | Osann | |
| 2014/0180677 A1 | 6/2014 | McCaffrey | |
| 2015/0066653 A1 * | 3/2015 | Mengle | G06Q 30/0269 |
| | | | 705/14.66 |

* cited by examiner

*Primary Examiner* — Satwant Singh
(74) *Attorney, Agent, or Firm* — Thompson Hine LLP

(57) ABSTRACT

Disclosed is a method and system for identifying and characterizing an analogy in a document. In one implementation, the method comprises identifying a candidate document. The candidate document comprises an analogy for a target concept, a region of interest and a linguistic marker included in the region of interest. Further, the method comprises classifying the candidate document as an analogy document or a non-analogy document based upon a size of a region of interest and a count of linguistic marker. Furthermore, the method comprises identifying a source concept from the analogy document. Subsequently, the method comprises characterizing the source concept with corresponding metadata. The metadata comprises a familiarity of the source concept, a length of the source concept, and a readability of the source concept.

20 Claims, 3 Drawing Sheets

IDENTIFYING AND CHARACTERIZING AN ANALOGY IN A DOCUMENT

TECHNICAL FIELD

The present subject matter described herein, in general, relates to a system and a method for identifying and characterizing an analogy, and more particularly a system and a method for identifying and characterizing an analogy in a document.

BACKGROUND

Analogical thinking is believed to be an important contributor to human intelligence and learning. Several studies indicate that analogical thinking contributed by an analogy, provided during learning, results in enhanced learning. In particular, the analogy helps increase the retention and recall capacity of a learner. Typically, the analogy utilized in learning compares a familiar concept with unfamiliar concept for explaining the learner about the unfamiliar concept.

Traditionally, the use of analogies, for example in a class relies on the resourcefulness or imagination of a teacher. In other example, a learner who takes initiative in self-learning may stumble upon the analogy in search of an explanation for the target concept. Conventionally, the analogy is not readily or easily available as a single resource or in a single location for the learner or the teacher. Conventional approach to obtain the analogy may be searching the Internet utilizing a general purpose search engine, for example Google™. But such an Internet search for the analogies often leads to thousands of pages, where only a few pages may contain the analogy. Thus making it mandatory for the learner or the teacher to read each page to obtain the analogy. Thus, resulting in substantial wastage of time. Further, the analogy obtained in the Internet search may itself be unfamiliar to the learner. Consequently the learner may have to repeat search multiple times and read each page to obtain the analogy.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for identifying and characterizing an analogy in a document. This summary is not intended to identify essential features of the claimed subject matter nor is it intended for use in determining or limiting the scope of the claimed subject matter.

In one implementation, a system for identifying and characterizing an analogy in a document is disclosed. The system may comprise a memory and a processor coupled to the memory. Further, the processor may be capable of executing instructions to perform steps of identifying a candidate document. The candidate document may comprise an analogy for a target concept, a region of interest and a linguistic marker included in the region of interest. Further, classifying the candidate document as an analogy document or a non-analogy document based upon a size of the region of interest and a count of the linguistic marker. Subsequently, identifying a source concept from the analogy document. The source concept may comprise the analogy. Finally, characterizing the source concept with corresponding metadata, wherein the metadata comprises a familiarity of the source concept, a length of the source concept, and a readability of the source concept In another implementation, a method for identifying and characterizing an explanatory analogy in a document is disclosed. In one aspect, in order to identify and characterize the explanatory analogy in a document, initially a candidate document may be identified. The candidate document comprises an analogy for a target concept, a region of interest and a linguistic marker included in the region of interest. Upon identification, the candidate document is classified as an analogy document or a non-analogy document based upon a size of a region of interest and a count of linguistic markers. Subsequent to the classification, a source concept is identified from the analogy document. The source concept comprises the analogy. Further to the identification, the source concept is characterized with corresponding metadata, wherein the metadata may comprise a familiarity of the source concept, a length of the source concept, and a readability of the source concept.

In yet another implementation, non-transitory computer readable medium embodying a program executable in a computing device for identifying and characterizing an analogy in a document is disclosed. The program may comprise a program code for identifying a candidate document. In one aspect the candidate document may comprise an analogy for a target concept, a region of interest and a linguistic marker included in the region of interest. The program may comprise a program code for classifying the candidate document as an analogy document or a non-analogy document based upon a size of a region of interest and a count of linguistic marker. The program may comprise a program code for identifying a source concept from the analogy document. The source concept may comprise the analogy. The program may comprise a program code for characterizing the source concept with corresponding metadata. In one aspect, the metadata may comprise a familiarity of the source concept, a length of the source concept, and a readability of the source concept.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Figure 1:
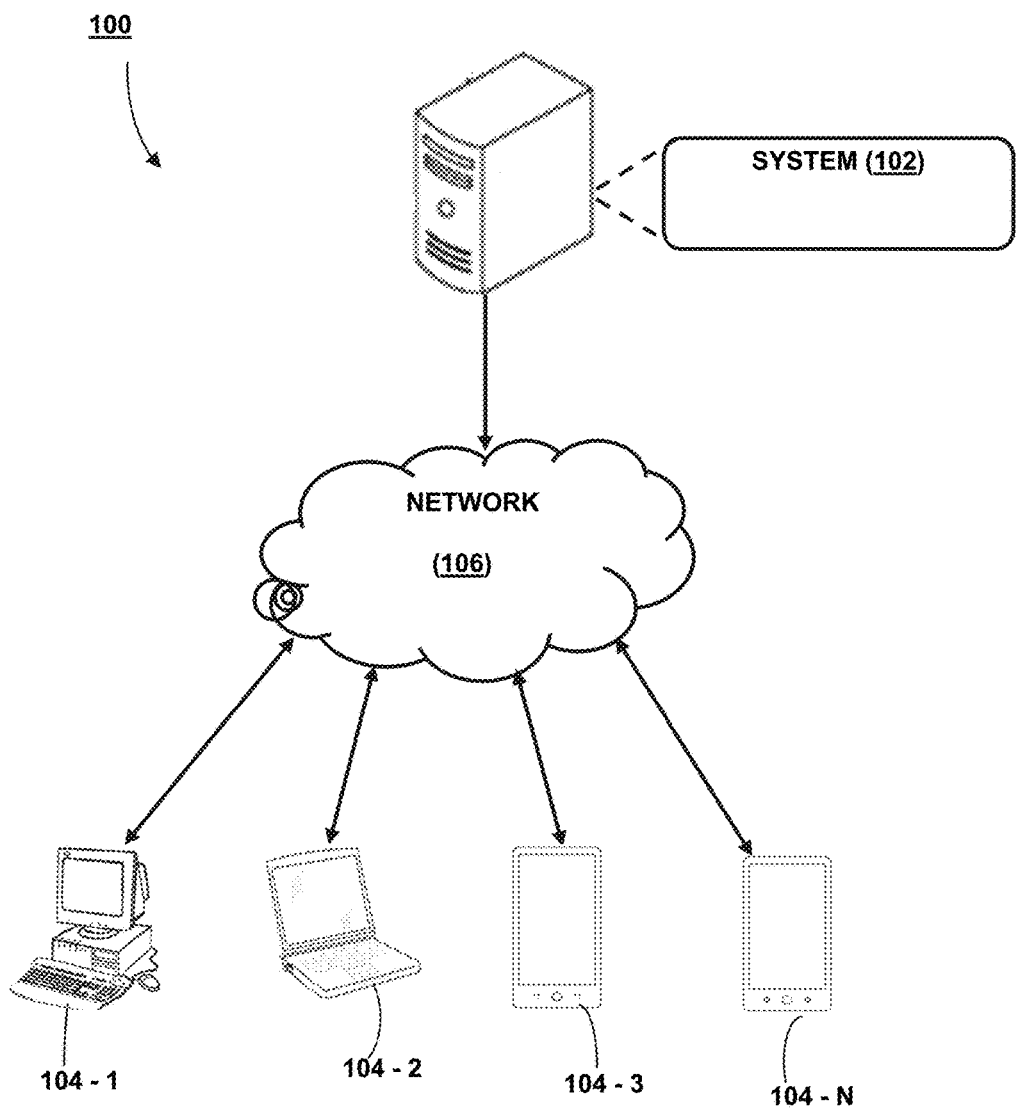
FIG. 1 illustrates a network implementation of a system for identifying and characterizing an analogy in a document, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

In an implementation, a system and a method for identifying and characterizing an analogy in a document is described. In one aspect, the analogy may be understood as a comparison between one concept and another concept, typically for the purpose of explanation or clarification. In one aspect, the document may be a text document, a web page, an image and the like. In the implementation, in order to identify and characterize an analogy in a document, at first, a candidate document may be identified. In one example, the candidate document may be a webpage, a text document, a .pdf file, an image, and the like. The candidate document may comprise a target concept, a region of interest, and a linguistic marker included in the region of interest. In one aspect, the target concept may be unrecognized or unfamiliar or complex concept about which a user wishes to learn. In one example, the target concept for which an analogy may be to be identified and characterized may be provided by the user. In another example, the target concept for which an analogy is to be identified and characterized may be selected automatically from a text. Further in the implementation, the region of interest may be defined and a size of the region of interest may also be identified. Furthermore, utilizing the defined region of interest, a count of the linguistic marker included in the region of interest may also be detected.

In the implementation, based on the size of the region of interest and the count of linguistic marker, the candidate document may be classified as an analogy document or a non-analogy document. Subsequent to the classification, a source concept may be identified from the analogy document. The source concept may comprise the analogy for the target concept. The source concept may be understood as a concept recognized or familiar to the user, wherein the source concept may be used to explain the target concept unrecognized or unfamiliar to the user. In one example, a plurality of source concepts may be identified and grouped in to one or more source concept clusters utilizing a hierarchical clustering methodology. In the implementation, the source concept may be characterized with metadata. The metadata may comprise a familiarity of the source concept, a length of the source concept, and a readability of the source concept. In an example, the one or more source concept clusters are characterized with metadata. In the example, the metadata may comprise a familiarity of the source concept cluster, a length of the source concept cluster, and a readability of the source concept cluster.

Subsequently, in an example where the target concept may be provided by the user, the source concept, comprising the explanatory analogy, corresponding to the target concept may be provided to the user. In one more example, where there are more than one source concepts for a single target concept provided by the user, the source concept may be ordered in a predefined format utilizing the metadata. Further, the ordered source concepts may be provided to the user. In one other example, where there are more than one source concepts for a single target concept provided by the user, the source concepts may be grouped in to source concept clusters. Further, the source concept clusters may be ordered in a predefined format utilizing the metadata and provided to the user.

In one other example, where the target concept may be obtained from a text, the source concept comprising the analogy may be combined with the text as an annotation.

In one more example, the target concept, and the corresponding source concept and source concept cluster may be stored in a repository.

Referring now to FIG. 1, a network implementation of a system 102 for identifying and characterizing an analogy in a document, in accordance with an embodiment of the present subject matter may be described. In one aspect of the embodiment, the system 102 may be configured to identify a candidate document. The candidate document may comprise an analogy for a target concept, a region of interest, and a linguistic marker included in the region of interest. Further, the system 102 may be configured to classify the candidate document as an analogy document or a non-analogy document based upon a size of a region of interest and a count of linguistic marker. Upon classification, the system 102 may be further configured to identifying a source concept from the analogy document. In one aspect, the source concept may comprise the analogy. Subsequently, the system 102 may be configured to characterize the source concept with corresponding metadata. The metadata may comprise a familiarity of the source concept, a length of the source concept, and a readability of the source concept.

In one embodiment, the present subject matter is explained considering that the system 102 may be implemented as a standalone system connects to a network. It may be understood that the system 102 may also be implemented in a variety of computing systems, such as a laptop computer, a desktop computer, a notebook, a workstation, a mainframe computer, a server, a network server, a cloud-based computing environment and the like.

In one implementation, the system 102 may comprise the cloud-based computing environment in which the user may operate individual computing systems configured to execute remotely located applications. In another embodiment, the system 102 may also be implemented on a client device hereinafter referred to as a user device. It may be understood that the system implemented on the client device supports a plurality of browsers and all viewports. Examples of the plurality of browsers may include, but not limited to, Chrome™, Mozilla™, Internet Explorer™, Safari™, and Opera™. It will be understood that the system 102 may be accessed by multiple users through one or more user devices 104-1, 104-2 . . . and 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
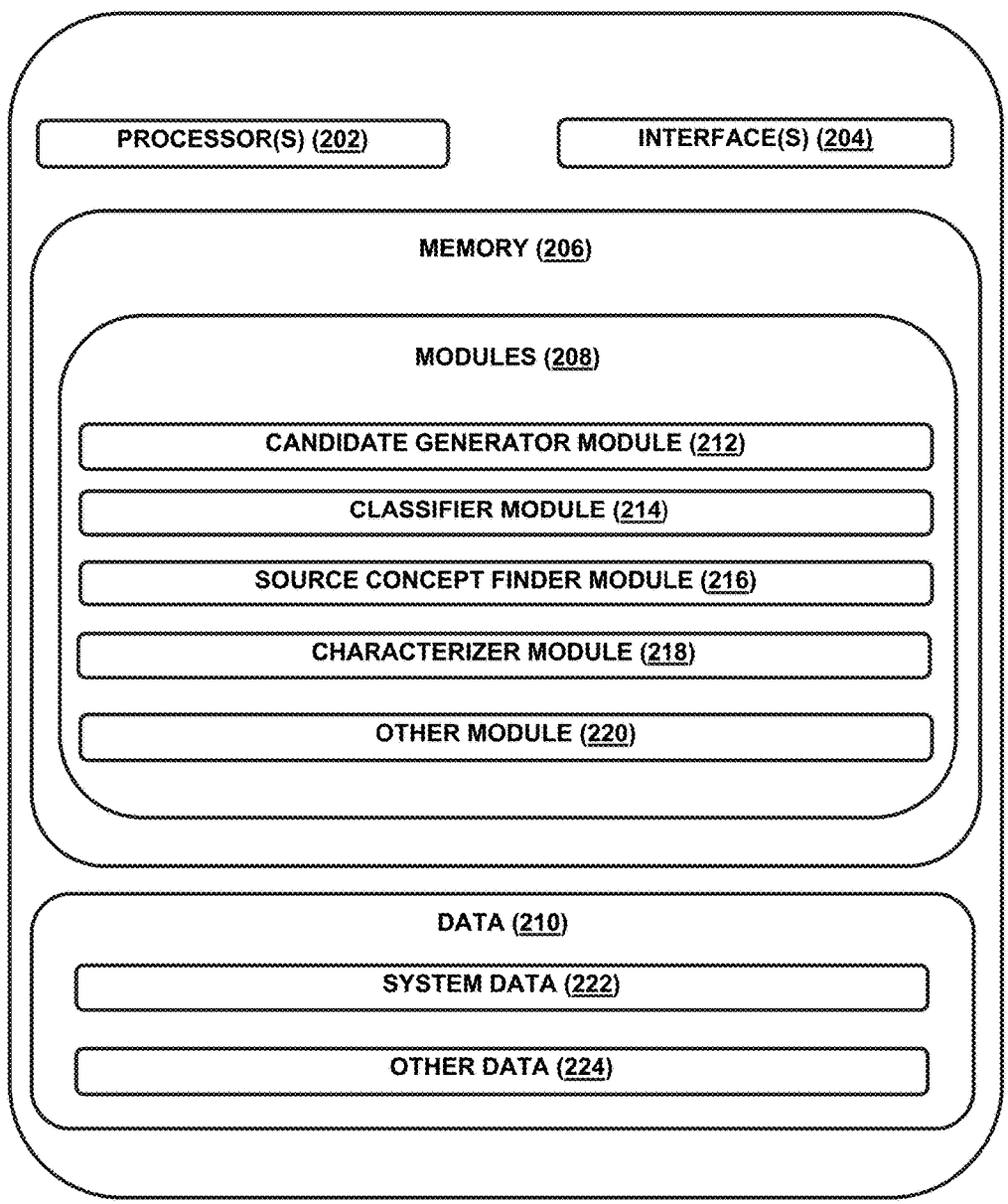
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a candidate generator module 212, a classifier module 214, a source concept finder module 216, a characterizer module 218, and other modules 220. The other modules 220 may include programs or coded instructions that supplement applications and functions of the system 102. The modules 208 described herein may be implemented as software modules that may be executed in the cloud-based computing environment of the system 102.

The memory 206, amongst other things, serves as a repository for storing data processed, received, and generated by one or more of the modules 208. The memory 206 may include data generated as a result of the execution of one or more modules in the other module 220. In one implementation, the memory may include data 210. Further, the data 210 may include a system data 222 for storing data processed, received, and generated by one or more of the modules 208. Furthermore, the data 210 may include other data 224 for storing data generated as a result of the execution of one or more modules in the other module 220.

In one implementation, at first, a user may use the client device 104 to access the system 102 via the I/O interface 204. The user may register them using the I/O interface 204 in order to use the system 102. In one aspect, the user may access the I/O interface 204 of the system 102 for identifying and characterizing explanatory an analogy in a document.

Candidate Generator Module 212

Referring to FIG. 2, in one embodiment the candidate generator module 212 may identify a candidate document. In one example, the candidate document may be identified by running a query on a search engine. The query may pertain to a subject about which a user may wish to explore. For example, a user may wish to know about a subject such as "bandwidth" and therefore may query a search engine on the subject "bandwidth." Upon querying the search engine, the candidate generator module 212 may fetch or identify a list of candidate documents which may have the word "bandwidth" along with certain possible analogies of the word "bandwidth."

Therefore, in one embodiment, the candidate document may be seen to comprise an analogy of a target concept, a region of interest, and a linguistic marker. The target concept may be understood as the subject, i.e. "bandwidth" in this example, about which the user has queried about. In one aspect, target concept may be understood as the subject unfamiliar to the user. The region of interest may be understood as a location where one or more analogies of the word "bandwidth" may be present in the candidate document. Further, the linguistic marker may be understood as an indicator of the presence of an analogy in the region of interest. For example, a linguistic marker such as a word "imagine" may be present in the region of interest. In this example, the word 'imagine" may be present in the following manners in the region on interest—"a) imagine a word similar to bandwidth, or b) imagine an analogy of bandwidth, or c) imagine a highway as an analogy for bandwidth."

In this way, all the linguistic markers present in the region of interest may be identified. In one implementation, the linguistic markers may comprise explanation markers, similarity markers, pronoun markers, analogy prefix markers, and the like. Examples of explanation markers may comprise—"imagine" and "this can be explained." Further, examples of the similarity markers may comprise "like", "similar," and "to." Further, examples of the analogy prefix markers may comprise "analogy." Furthermore, examples of pronoun markers may comprise—"suppose I am" or "suppose X is doing something." In one implementation, the candidate generator module 212 may be configured to store data in the system data 222.

Classifier Module 214

In this embodiment, the classifier module 214 may define the region of interest and detect a size of the region of interest in the candidate document. Considering the above example, the classifier module 214 may define a region of interest as a 100-word window around each occurrence of the word "analogy" in the candidate document. For example, if the word "analogy" is present in the candidate document, then in order to determine a region of interest, the classifier module 214 may define the region of interest by considering 50 words appearing after the word "analogy" and 50 words appearing before the word "analogy," thereby defining a region of interest of 100 words. It must be understood that a candidate document may have multiple region of interests depending upon a number of occurrences of the word "analogy."

After detecting all the regions of interest, the classifier module 214 may count a number of linguistic markers in all the regions of interest. Post that, the classifier module 214 may classify the candidate document as an analogy document or a non-analogy document based upon the size of a region of interest and the count of linguistic markers present in the candidate document. Specifically, all the candidate documents are classified either as analogy documents or as non-analogy documents, wherein the non-analogy documents are discarded and the analogy documents are processed further. In one implementation, the classification of the candidate document may be performed using a random forest methodology. In one other implementation, the classification of the candidate document may be performed using a Naive Bayes methodology. In one more implementation, the classification of the candidate document may be performed using a Support Vector Machines methodology. In one implementation, the classifier module 214 may be configured to store data in the system data 222.

Source Concept Finder Module 216

In the embodiment, from the analogy document, the source concept finder module 216 may identify a source concept. In the example, the source concept for the target concept "bandwidth" may be identified using a Stanford parser method and a Wikipedia mining tool. The source concept may be understood as a concept recognized or familiar to the user, wherein the source concept may be used to explain the target concept unrecognized or unfamiliar to the user. Considering the above example, the source concept finder module 216 may identify a source concept "highway" from the analogy document for the target concept "bandwidth." In the example, the source concept "highway" may be familiar to the user. Furthermore, the source concept "highway" may also be an explanatory analogy. The explanatory analogy may be understood as the analogy explaining the target concept by elaborating in detail on the similarities in the structure or/and working of the target concept and the source concept.

In one other embodiment, the source concept finder module 216 may identify one or more source concepts. In the example, the source concepts "highway," "car," "traffic," "wastepipes," and "water-pipe", are identified from the analogy documents for "bandwidth" about which the user has queried upon. Further to the identification, the source concept finder module 216 may group the source concepts in to one or more source concept clusters. In this example, the source concepts such as "highway," "car," "traffic," "wastepipes," and "water-pipe" may be grouped in to source concept clusters such as "highway", "wastepipes", and "water-pipe." It may be noted that the source concept cluster called "highway" may comprise the source concepts "highway", "car", and "traffic". In one embodiment, grouping the source concepts into source concept clusters may be performed using a hierarchical clustering methodology. In one implementation, the source concept finder module 216 may be configured to store data in the system data 222.

Characterizer Module 218

In the embodiment, the characterizer module 218 may characterize or associate the source concept with corresponding metadata. In one other embodiment, the characterizer module 218 may characterize the source concept or the source concept clusters or both with corresponding metadata. Further, the metadata may comprise a familiarity of the source concept, a familiarity of the source concept cluster, a length of the source concept, a length of the source concept cluster, a readability of the source concept, and a readability of the source concept cluster.

Considering the above example of "bandwidth," the familiarity of the source concept, and the familiarity of the source concept cluster may be calculated using an extracting Distributional related words using Co-occurrences (DISCO) tool. Further, the length of the source concept, and the length of source concept cluster may be calculated using the size of the region of interest. Furthermore, the readability of the source concept, and the readability of the source concept cluster may be calculated using Flesch-Kincaid readability score method.

In the example of the user querying about "bandwidth", the characterizer module 216 characterizes the source concept clusters "highway", "wastepipes", and "water-pipe" with the metadata. In one implementation, the characterizer module 218 may store data in the system data 222. In one other implementation the characterizer module 218 may provide the source concept clusters "highway", "wastepipes" and "water-pipe" to the user as analogy for "bandwidth".

Exemplary embodiments discussed above may provide certain advantages. Though not required to practice aspects of the disclosure, these advantages may include those provided by the following features.

Some embodiments enable the system and the method to automatically find documents containing explanatory analogies from the Internet.

Some embodiments enable the system and the method to automatically find documents containing explanatory analogies from a repository of documents.

Some embodiments enable the system and the method to automatically mine source concepts for an analogy.

Figure 3:
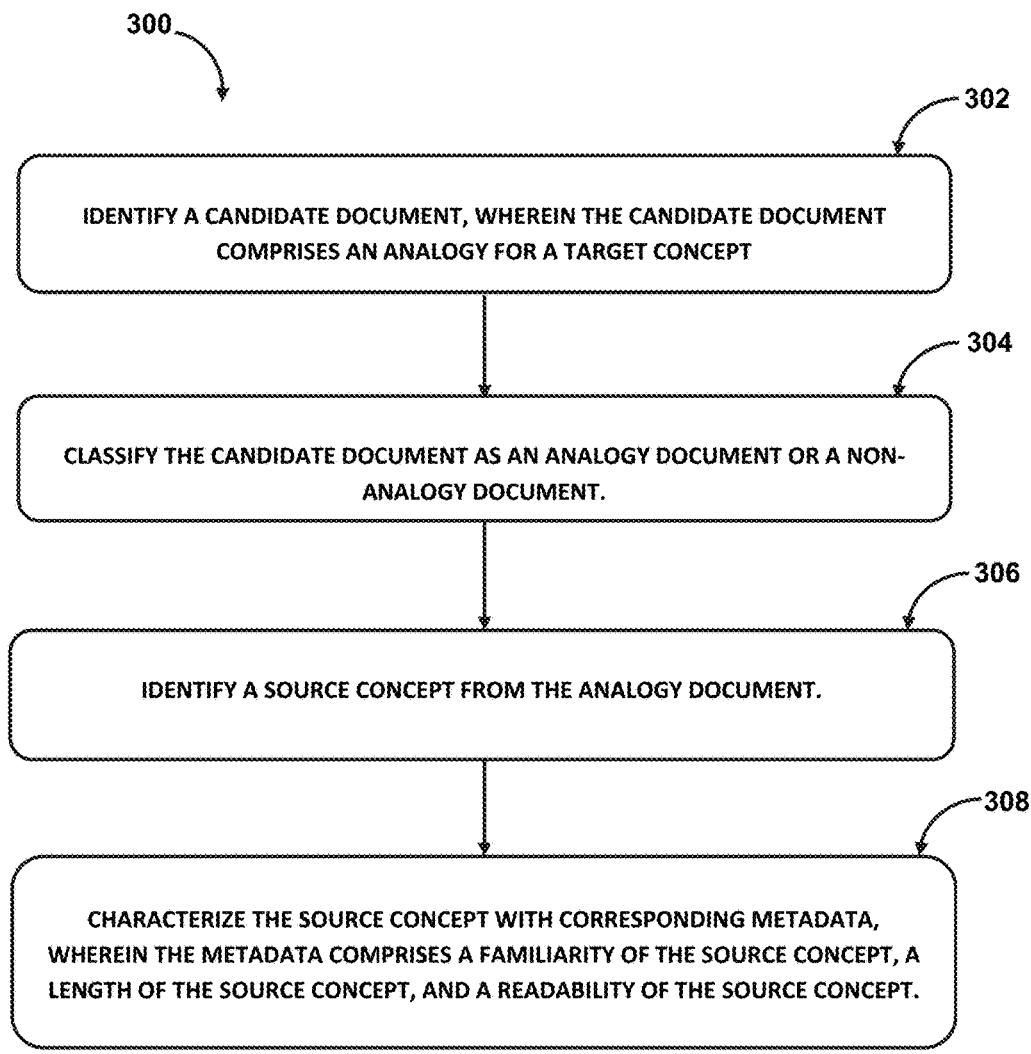
FIG. 3 illustrates a method for identifying and characterizing an analogy in a document, in accordance with an embodiment of the present subject matter.

Some embodiments enable the system and the method to automatically characterize an analogy with metadata such as familiarity of source concept, length of source concept and readability of source concept Referring now to FIG. 3, a method 300 for identifying and characterizing an analogy in a document is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a candidate document may be identified. In one aspect, the candidate document may comprise an analogy for a target concept. Further, the candidate document may comprise a region of interest and a linguistic marker included in the region of interest. In one implementation, a candidate document may be identified by the candidate generator module 212.

At block 304, the candidate document may be classified as an analogy document or a non-analogy document based upon a size of a region of interest and a count of linguistic marker. In one implementation, the candidate document may be classified by the classifier module 214.

At block 306, a source concept from the analogy document may be identified. The source concept may comprise the analogy. In one implementation, a source concept from the analogy document may be identified by the source concept finder module 216.

At block 308 the source concept may be characterized with corresponding metadata. In one aspect, the metadata may comprise a familiarity of the source concept, a length of the source concept, and a readability of the source concept. In one implementation, the source concept may be characterized by the characterizer module 218.

Exemplary embodiments discussed above may provide certain advantages. Though not required to practice aspects of the disclosure, these advantages may include a method for identifying and characterizing explanatory analogies.

Although implementations for methods and systems for identifying and characterizing explanatory analogies have been described in language specific to structural features and/or methods, it is to be understood that the appended claims are not necessarily limited to the specific features or methods described. Rather, the specific features and methods are disclosed as examples of implementations for identifying and characterizing explanatory analogies.

The invention claimed is:

1. A method for identifying and characterizing an analogy in a document, the method comprising:
   identifying a candidate document, wherein the candidate document comprises an analogy for a target concept, a region of interest, and a linguistic marker included in the region of interest;
   classifying the candidate document as an analogy document or a non-analogy document based upon a size of the region of interest and a count of the linguistic marker;
   identifying a source concept from the analogy document, wherein the source concept comprises the analogy; and
   characterizing the source concept with corresponding metadata, wherein the metadata comprises a familiarity of the source concept, a length of the source concept, and a readability of the source concept, and wherein the familiarity of the source concept is calculated using an extracting Distributional related words using Co-occurrences (DISCO) tool, the length of the source concept is calculated using the size of the region of interest, and the readability of the source concept is calculated using a Flesch-Kincaid readability score method.

2. The method of claim 1, further comprising:
   defining the region of interest in the candidate document;
   identifying the size of the region of interest; and
   detecting the count of the linguistic marker included in the region of interest.

3. The method of claim 1, further comprising grouping the source concept into one or more source concept clusters utilizing a hierarchical clustering methodology.

4. The method of claim 3, further comprising characterizing the one or more source concept clusters with the metadata.

5. The method of claim 1, wherein the candidate document is classified using one of a random forest methodology, a naive bayes methodology, and a support vector machines methodology.

6. The method of claim 1, wherein the linguistic marker comprises an explanation marker, a similarity marker, a pronoun marker, and an analogy prefix marker.

7. The method of claim 1, wherein the analogy is an explanatory analogy.

8. A system for identifying and characterizing an analogy in a document, the system comprising:
   a memory; and
   a processor coupled to the memory, wherein the processor is capable of executing instructions to perform steps of:
   identifying a candidate document, wherein the candidate document comprises an analogy for a target concept, a region of interest and a linguistic marker included in the region of interest;
   classifying the candidate document as an analogy document or a non-analogy document based upon a size of the region of interest and a count of the linguistic marker;
   identifying a source concept from the analogy document, wherein the source concept comprises the analogy; and
   characterizing the source concept with corresponding metadata, wherein the metadata comprises a familiarity of the source concept, a length of the source concept, and a readability of the source concept, and wherein the familiarity of the source concept is calculated using an extracting Distributional related words using Co-occurrences (DISCO) tool, the length of the source concept is calculated using the size of the region of interest, and the readability of the source concept is calculated using a Flesch-Kincaid readability score method.

9. The system of claim 8, wherein the processor is further capable of executing instructions to perform steps of
   defining the region of interest in the candidate document;
   identifying the size of the region of interest; and
   detecting the count of linguistic marker included in the region of interest.

10. The system of claim 8, further comprising grouping the source concept into one or more source concept clusters utilizing a hierarchical clustering methodology.

11. The system of claim 10, further comprising characterizing the one or more source concept clusters with the metadata.

12. The system of claim 8, wherein the candidate document is classified using one of a random forest methodology, a naive bayes methodology, and a support vector machines methodology.

13. The system of claim 8, wherein the linguistic marker comprises an explanation marker, a similarity marker, a pronoun marker, and an analogy prefix marker.

14. The system of claim 8, wherein the analogy is an explanatory analogy.

15. A non-transitory computer program product having embodied thereon a computer program for identifying and characterizing an analogy in a document, the computer program product storing instructions, the instructions comprising instructions for:
- identifying a candidate document, wherein the candidate document comprises an analogy for a target concept, a region of interest and a linguistic marker included in the region of interest;
- classifying the candidate document as an analogy document or a non-analogy document based upon a size of the region of interest and a count of the linguistic marker;
- identifying a source concept from the analogy document, wherein the source concept comprises the analogy; and
- characterizing the source concept with corresponding metadata, wherein the metadata comprises a familiarity of the source concept, a length of the source concept, and a readability of the source concept, and wherein the familiarity of the source concept is calculated using an extracting Distributional related words using Co-occurrences (DISCO) tool, the length of the source concept is calculated using the size of the region of interest, and the readability of the source concept is calculated using a Flesch-Kincaid readability score method.

16. A non-transitory computer program of claim 15, further comprising:
- defining the region of interest in the candidate document;
- identifying the size of the region of interest; and
- detecting the count of linguistic marker included in the region of interest.

17. A non-transitory computer program of claim 15, further comprising grouping the source concept into one or more source concept clusters utilizing a hierarchical clustering methodology.

18. A non-transitory computer program of claim 17, further comprising characterizing the one or more source concept clusters with the metadata.

19. A non-transitory computer program of claim 15, wherein the candidate document is classified using a random forest methodology.

20. A non-transitory computer program of claim 15, wherein the linguistic marker comprises an explanation marker, a similarity marker, a pronoun marker, and an analogy prefix marker.

* * * * *